US006222445B1

(12) United States Patent
Beckhusen

(10) Patent No.: US 6,222,445 B1
(45) Date of Patent: Apr. 24, 2001

(54) ENGINE MONITORING SYSTEM AND ASSOCIATED METHOD

(75) Inventor: Fred K. Beckhusen, Allen, TX (US)

(73) Assignee: Micro Technology Services, Inc., Richardson, TX (US)

( * ) Notice: Subject to any disclaimer, the term of this patent is extended or adjusted under 35 U.S.C. 154(b) by 0 days.

(21) Appl. No.: 09/306,679

(22) Filed: May 6, 1999

(51) Int. Cl.[7] ...................................................... B60Q 1/00

(52) U.S. Cl. ...................... 340/457; 340/457.4; 340/438; 340/439; 701/30; 307/10.6

(58) Field of Search ................................ 340/457, 457.4, 340/428, 438, 439, 646, 648; 701/29, 30; 123/406.11, 406.57; 307/10.6; 324/380, 381, 382

(56) References Cited

U.S. PATENT DOCUMENTS

| | | | | |
|---|---|---|---|---|
| 3,753,082 | * | 8/1973 | Richards | 123/406.63 |
| 3,893,108 | | 7/1975 | McBride, Jr. et al. | 340/420 |
| 3,955,723 | * | 5/1976 | Crawford et al. | 324/392 |
| 4,002,155 | * | 1/1977 | Harned et al. | 123/406.39 |
| 4,629,334 | | 12/1986 | Hochstein | 374/103 |
| 4,706,193 | | 11/1987 | Imajo et al. | 364/424 |
| 4,742,476 | | 5/1988 | Schwartz et al. | 364/550 |
| 4,796,204 | | 1/1989 | Inoue | 364/550 |
| 4,845,623 | | 7/1989 | Korb | 364/431.03 |
| 4,884,054 | | 11/1989 | Moon, Sr. | 340/309.15 |
| 5,043,697 | * | 8/1991 | Ayabe et al. | 340/457.4 |
| 5,060,156 | | 10/1991 | Vajgart et al. | 364/424.03 |
| 5,382,942 | | 1/1995 | Raffa et al. | 340/457.4 |
| 5,559,494 | * | 9/1996 | Thompson | 340/439 |
| 5,633,796 | * | 5/1997 | Cullen et al. | 701/30 |

* cited by examiner

*Primary Examiner*—Daryl Pope
(74) *Attorney, Agent, or Firm*—Smith ,Danamraj & Youst, P.C.

(57) ABSTRACT

An engine service monitoring system and method for an engine having a spark plug, an ignition circuit with a transformer and a spark plug wire disposed between the spark plug and a coil of the transformer. A counting circuit for counting the ignition or spark pulses is inductively coupled to the spark plug wire such that for every spark pulse generated, a DC pulse is provided by a rectifier of the counting circuit. The DC pulses are provided to a computing element which computes the total number of the pulses, selectively adjusts the count on the basis of a low-oil pressure condition, an out-of-range temperature condition or other suitable operator-defined condition. The computing element also compares the adjusted count with one or more service change interval threshold values to provide an alarm to indicate that a service change is needed. The threshold values are either factory-set or field-adjustable.

20 Claims, 6 Drawing Sheets

ENGINE MONITORING SYSTEM AND ASSOCIATED METHOD

BACKGROUND OF THE INVENTION

1. Technical Field of the Invention

This invention relates to engine service monitoring systems. More particularly, this invention relates to a service monitoring system adapted for use with engines having at least a spark plug and an ignition circuit therefor.

2. Description of Related Art

Various service parameters are typically measured periodically with respect to the maintenance of a vehicle or its engine. For example, it is well-known in the motor vehicle art that engine durability is directly related to the lubricating ability of the engine crankcase oil, and that its lubricating ability degrades with engine operation and time. Accordingly, a service parameter relating to the operation of the engine is periodically monitored so that an indication that the oil needs to be replaced may be provided to an operator at appropriate times. It is also well-known that not only the engine oil's lubricating ability, but also a host of other engine and vehicular maintenance variables are typically related to the operation of the engine and elapsed time.

Therefore, it is widely recognized that various service intervals may be provided for the use of an operator of the vehicle or equipment so that recommended service maintenance schedules may be followed. By way example, automobile manufacturers of gasoline fueled passenger cars and light trucks typically recommend that, barring severe operating conditions, the engine oil should be changed every 7,500 miles (12,000 km) or 12 months, whichever comes first. Under severe operating conditions, however, the manufacturers' schedule recommends that the engine oil be changed every 3,000 miles (4,800 km) or 3 months, whichever comes first. In this regard, severe operating conditions are defined as including trips less than 4 miles (6.4 km) in below freezing weather, extended idling, trailer towing, operating in dusty areas, and extended stop-and-go driving.

With respect to the automobile engine oil example described above and in regard to the use of engine oil in engines for other equipment, several solutions currently exist for determining when it is required to change the oil in the engine. However, these solutions are typically beset with numerous shortcomings and deficiencies. For example, existing engine oil monitoring systems may be used only on an engine having a tachometric output on the primary side of the transformer used in the engine ignition circuit. Those of ordinary skill in the art should appreciate that such engines are typically found only in vehicles with distributors, thereby greatly limiting the types of engines with which the extant oil monitoring systems may be used.

Some current solutions require connections through the firewall that separates the engine compartment and the space occupied by human operators. Therefore, not only is the ease of installation of the current monitoring systems reduced thereby, but the operator safety is also compromised to a significant degree.

Moreover, conventional oil monitoring systems typically come with factory-loaded engine-type coefficients and service interval thresholds which cannot be altered or adjusted in the field. Accordingly, these systems are generally restricted to the factory-set engine types only. Additionally, known oil monitoring systems are not, in general, adaptable for use with different types of engine fuel. Also, they cannot adapt to different number of cylinders or the strokes/cycles of an engine. That is, a conventional engine monitoring system cannot typically be used accurately with an engine that can be operated with several fuels. Nor can a monitoring system, usable with a single cylinder engine, be used with an engine that has multiple cylinders. Similarly, a monitoring system usable with a two-stoke engine may not be usable with a four-stroke engine.

Accordingly, based upon the foregoing discussion, it should be readily appreciated that there exists an acute need for an engine service monitoring system that overcomes the deficiencies and shortcomings of the existing solutions described hereinabove. The present invention provides such an advantageous solution. It will be recognized upon reference hereto that although the teachings of the present invention are exemplified in terms of the engine oil change service parameter, various other service parameters may also be monitored within the scope hereof.

SUMMARY OF THE INVENTION

In one aspect, the present invention is directed to a service monitoring system for an engine of the type which includes at least one spark plug connected to a coil of an ignition transformer via a spark plug wire. The spark plug provides one or more spark pulses while the engine is turned on by an ignition contact. The service monitoring system comprises a magnetic core having a passage therethrough for surrounding the spark plug wire and a pickup coil with a conductive wiring disposed around the magnetic core. The pickup coil is inductively coupled to the spark plug wire for generating an induced current through the conductive wiring of the pickup coil when the spark pulses are created. Counting circuitry is coupled to the pickup coil for determining a count of induced current pulses corresponding to the spark pulses. Also included in the service monitoring system is an alarm indicator coupled to the counting circuitry to indicate a status of a service parameter, responsive to the count of the induced current pulses.

In another aspect, the present invention is directed to an engine service monitoring system (ESMS) adapted for use with an engine, the engine being operable with an ignition circuit having a spark plug wire and a spark plug. The ESMS comprises counting means for counting ignition pulses generated in the course of operation of the engine so as to determine a count of the ignition pulses. There are means for inductively coupling the counting means to the spark plug wire; means for storing a threshold value with respect to a service parameter; means for comparing the count of the ignition pulses to the threshold value; and means for providing an alert to an operator when the count of the ignition pulses exceeds the threshold value. In exemplary embodiments, the alert preferably comprises an appropriate audible or visual indication.

In a yet further aspect, the present invention is related to a method of monitoring a service parameter associated with an engine having a spark plug, an ignition circuit with a transformer and a spark plug wire disposed between the spark plug and the transformer. In this method, a counting circuit is inductively coupled to the spark plug wire of the engine. When the engine is operated, the method begins by counting the spark plug pulses generated so as to determine a count thereof. The temperature of the engine is measured by taking a measurement of the temperature of the air surrounding the engine so that the count of the spark plug impulses may be adjusted based on the measured engine temperature. The adjusted count of the spark plug pulses is then compared with a selected threshold value. If the adjusted count exceeds the threshold value, an alarm is provided.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

The innovative teachings of the present patent application will be described with particular reference to numerous exemplary embodiments. However, it should be understood that this class of embodiments provides only a few examples of the many advantageous uses of the innovative teachings contained herein. In general, statements made in the specification of the present application do not necessarily limit any of the various claimed aspects of the present invention. Moreover, some statements may apply to some inventive features but not to others.

Figure 1:
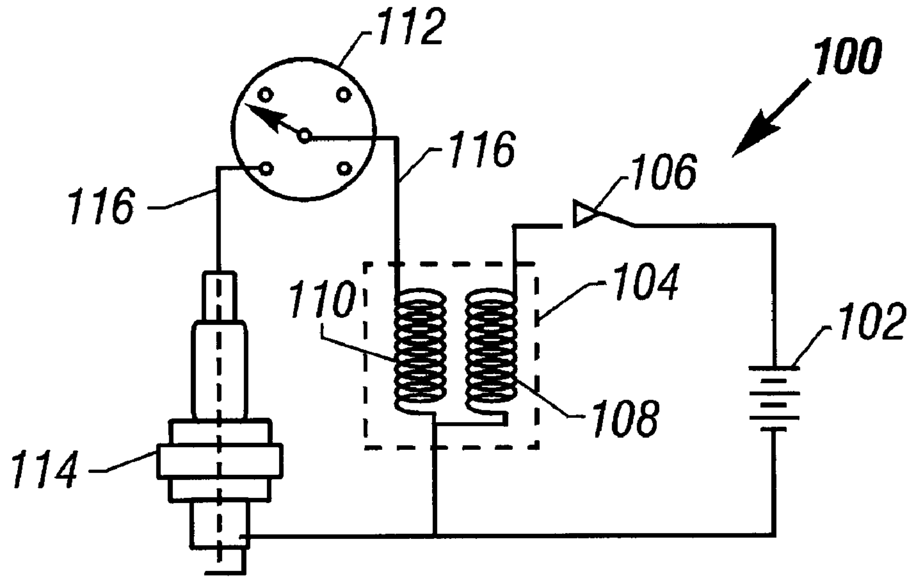
FIG. 1 depicts a schematic diagram of a typical spark plug ignition system with which the present invention may be practiced.

In the drawings, like or similar elements are designated with identical reference numerals throughout the several views, and the various elements depicted are not necessarily drawn to scale. Referring now to FIG. 1, depicted therein is a schematic diagram of a typical spark plug ignition system 100 used in a conventional internal combustion engine (not shown). As an example, only one spark plug 114 is shown herein, although it should be apparent to one of ordinary skill in the art that several spark plugs may typically be provided as part of the spark plug ignition system 100.

As is known, spark pulses in the engine are provided by the ignition system 100 which are used to fire the spark plug 114. These ignition or spark pulses are generated by the interruption of current through a primary coil 108 of a high voltage transformer 104, resulting in a high voltage pulse at a secondary coil 110 thereof. An ignition contact 106, which may be implemented as an electronic switch, a set of electro-mechanical contact points and the like, is preferably provided for this purpose in the circuit pathway between the high voltage transformer 104 and a battery 102. The output of the secondary coil 110 may be connected via a spark plug wire 116 to an electric signal distributing device such as, for example, a distributor 112 which distributes the high voltage pulses generated in the secondary coil 110 to an appropriate spark plug, for example, the spark plug 114, in a conventional manner.

Figure 2:
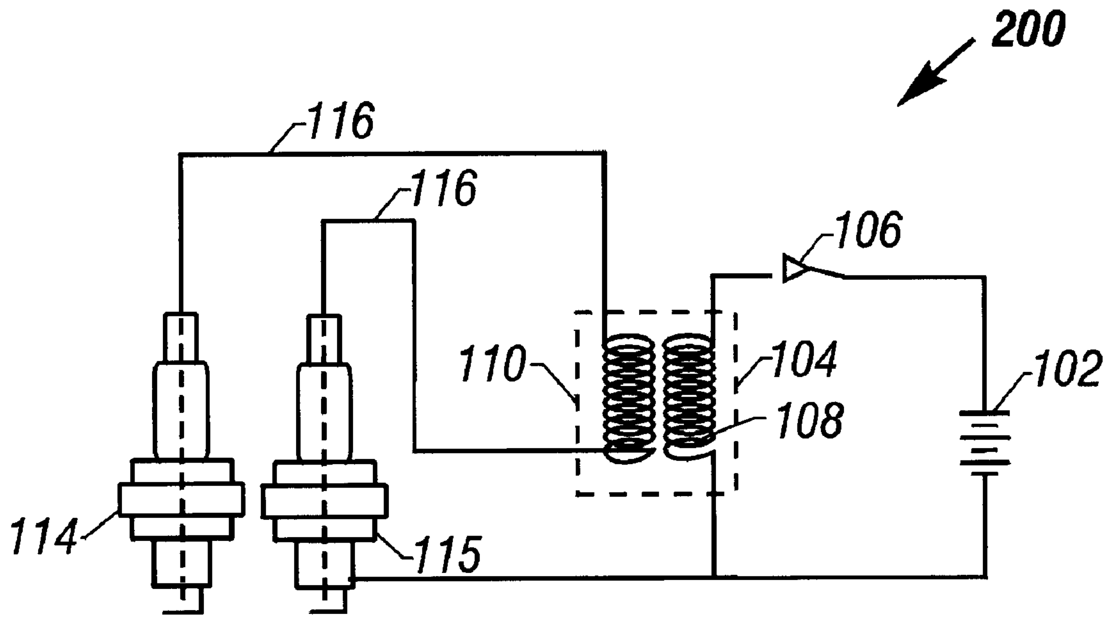
FIG. 2 depicts a schematic diagram of a typical dual spark plug ignition system with which the present invention may be practiced.

FIG. 2 depicts a schematic diagram of a typical dual spark plug ignition system 200 which is preferably used in some two-cylinder engines (not shown). The ignition system 200 is similar to the spark plug ignition system 100 described hereinabove. Accordingly, only the salient features of the ignition system 200 are described herein.

Two spark plugs, 114 and 115, are provided in the ignition system 200, each of which is connected to the secondary coil 110 via the corresponding spark plug wire 116. The spark plugs 114 and 115 are disposed in their respective cylinders of a two-cylinder engine (not shown) in a conventional manner.

It should be appreciated that the teachings of the present invention may be practiced in either type of the ignition systems set forth in the foregoing. It is believed that in order to appreciate the many advantageous and innovative features of the present invention, a proper understanding of the spark plug firing operation may be useful. Accordingly, a brief description thereof is set forth immediately below, taken in conjunction with FIGS. 1 and 2 above.

Figure 3:
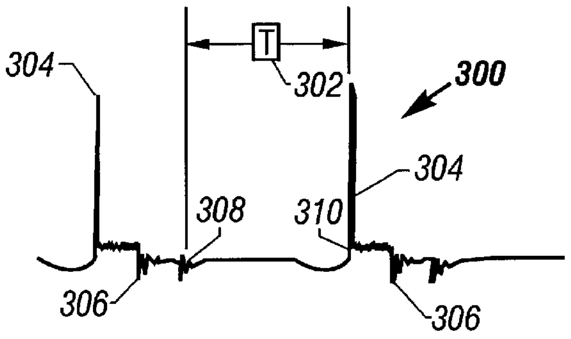
FIG. 3 depicts a discharge waveform of a spark plug in a conventional spark plug ignition system.

Referring now to FIG. 3, a discharge waveform 300 associated with a spark plug firing sequence is depicted. The sparking sequence begins when the contact 106 is closed and allows the voltage of the battery 102 to be applied through the primary coil 108 of the high voltage transformer 104. The ignition contact 106 is closed for a long period of time relative to the time the contact 106 is opened. As long as the contact 106 is closed, current from the battery 102 is provided to the primary coil 104. Because of the current flow therethrough, a large magnetic field is generated in the primary coil 108 during the time interval 302 (labeled as "T" in FIG. 3). The contact 106 is closed at the beginning of the period, shown herein with the reference numeral 308. At the end of the period, shown with reference numeral 310, the contact 106 is open.

The magnetic field in the primary coil 108 builds up to a saturation point where it can hold no more energy. In other words, the primary coil 108 saturates during the closed contact interval T 302. It should be appreciated that this saturation point is typically set by the magnetic properties of the materials with which the primary coil 108 is manufactured. Accordingly, the total amount energy available to power the spark plugs 114 and 115 is fixed by the magnetic properties of the primary coil 108 to the point where no more magnetic energy can be stored.

In response to the energy stored in the primary coil 108, there is a release of energy in the secondary coil 110. The total energy that will be released in the secondary coil 110 is broadly related to the total amount of magnetic field stored in the primary coil 108. More particularly, the voltage generated in the secondary coil 110 is related to the number of windings in the primary and secondary coils 108 and 110, respectively, plus the rate of change of magnetic field stored in the primary coil 108. When the electrical current flow through the primary coil 108 is interrupted by the contact 106, the saturated magnetic field therein quickly collapses. The rapid rate of change in the magnetic field generates a large voltage in the secondary coil 110 which is sent to the spark plugs. This is shown in the discharge waveform 300 as a peak 304. The high voltage breaks down the initial resistance of the air molecules in the spark plug gap by ionizing the atoms, thus allowing a current to flow therethrough. The current flow is continued at a lower voltage, until the energy stored in the primary coil 108 is discharged, shown as a peak 306 in the discharge waveform 300, once the initial resistance is overcome by ionization. In some implementations, current may be limited by a series resistor arrangement to suppress electro-magnetic interference. When the saturated primary coil 108 expends all of its stored energy, the contact 106 is timed to close so that the pulsed discharge waveform 300 repeats.

It should be readily apparent to those of ordinary skill in the art that during the time that current flows in the spark plug wire 116, the spark plug, for example, spark plug 114 or 115, fires continuously for that fixed period of time, shown in FIG. 3 as the time between the peaks 304 and 306. In accordance with the teachings of the present invention, this power flow through the plug and plug wire is used preferably to power and trigger a diagnostic monitoring system such as, for example, an engine service monitoring system (ESMS) or an engine oil monitoring system (EOMS). Hereinafter, the terms ESMS and EOMS will be used somewhat synonymously for the purposes of illustrating the central teachings of the present invention.

Figure 4:
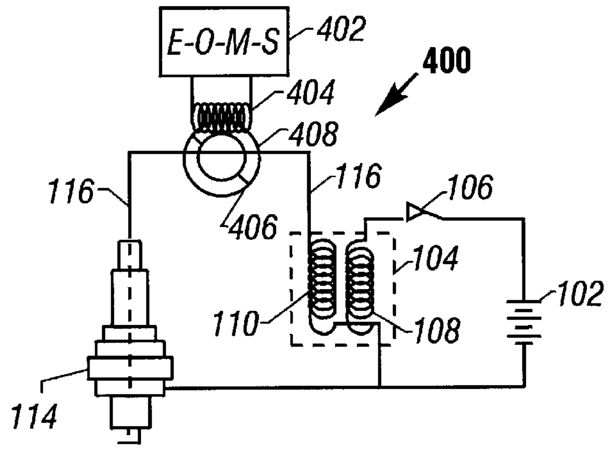
FIG. 4 depicts a schematic diagram illustrating the inductive coupling of a presently preferred exemplary embodiment of an engine service monitoring system (ESMS) in accordance with teachings of the present invention.

Referring now to FIG. 4, depicted therein is a schematic diagram illustrating an inductively coupled, presently preferred exemplary embodiment of an EOMS 402 in accordance with the teachings of the present invention. The EOMS 402 is inductively coupled to the spark plug wire 116 by means of an inductive coil 404 (also referred to as a "pickup" coil) disposed around a magnetic core 408. In one aspect of the present invention, the magnetic core 408 may preferably be comprised of a ferromagnetic material such as, for example, iron, ferrite and the like.

The magnetic core 408, preferably of a toroid shape, includes aperture means 406, such as a split, groove, passage, channel, et cetera, which may be of any geometry, for allowing the core 408 to open and pass the spark plug wire 116 therethrough easily. The magnetic core 408 may, in some implementations, be designed in other configurations also.

As will be explained below, it should be appreciated that the inductive coupling between the EOMS 402 and the spark plug wire 116 allows the EOMS to be independent of the type of the engine, number of cylinders, or type of ignition system used. Accordingly, it should be further appreciated that the inductively coupled EOMS of the present invention overcomes these and other such limitations of current monitoring systems that use engine tachometer output connections for engine oil monitoring.

In conventional systems, the tachometer output is typically always connected on the side of the primary coil 108 of the spark plug ignition circuit so that the opening and closing of the contact switch 106 may be monitored. Accordingly, the firing of the spark plug 114 is synchronized to the engine rotation and there is a direct and fixed relationship between the number of tachometric pulses and the number of rotations of the engine. For example, a four cycle, four cylinder engine generates two tachometer output pulses for every revolution of the engine's crankshaft. On the other hand, a four cycle, eight cylinder engine generates four tachometer output pulses for every revolution of the crankshaft. As more cylinders are added to an engine, more tachometric pulses are generated per revolution of the engine. Accordingly, it can be readily seen that a conventional oil monitoring system that is based on counting tachometric pulses is not independent of the engine type and/or the number of cylinders therein.

In the present invention, the connection between the EOMS 402 and the spark plug ignition circuit is achieved by way of magnetic inductive coupling on the secondary side of the transformer 104. Thus, by way of example, a four cycle engine generates an output pulse every other revolution, regardless of the number of the cylinders. Moreover, it should be appreciated that the present invention is useful in engines that have no tachometer output, such as magneto systems typically found in lawn mowers, power tools, et cetera. Moreover, the innovative teachings of the present invention may be gainfully employed in engine systems that have a tachometer output but no engine battery such as, for example, airplane engines where the battery is replaced with a moving magnet. In addition, it should also be realized that the inductive coupling between the EOMS 402 and the spark plug ignition circuit allows the EOMS to operate without depending upon other power sources.

Figure 5:
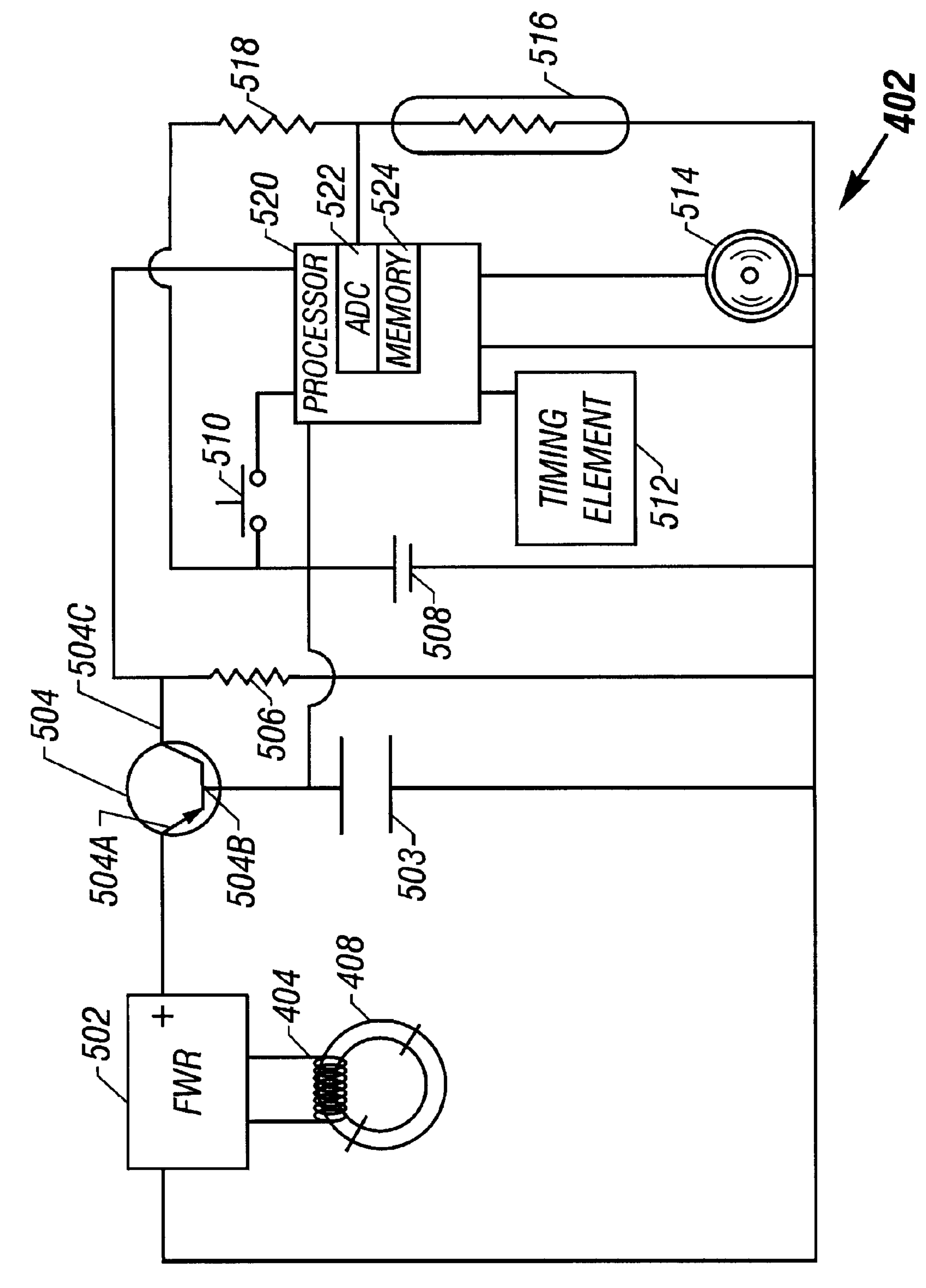
FIG. 5 depicts a schematic diagram of a presently preferred exemplary embodiment of an ESMS in accordance with teachings of the present invention.

FIG. 5 depicts a schematic diagram of a presently preferred exemplary embodiment of the EOMS 402 in accordance with the teachings of the present invention. The pickup coil 404 is connected to a rectifier 502 for rectifying the AC pulse signal on the spark plug wire (not shown) to a DC power signal. Preferably a full-wave rectifying (FWR) device is used for maximum power transfer. Further, by using a full-wave rectifier, the pickup coil 404 may be connected in either possible orientation to the spark plug wire, as conventional current that flows in either direction is steered by the full-wave rectifier device in the direction out of the positive (+) pin, regardless of the orientation of the connection.

The DC output of the rectifier 502 is provided through a switching device 504, for example, preferably via an emitter 504-A and base 504-B of a p-n-p transistor in a common-base configuration, to a capacitive storage element 503. The storage element 503 stores energy, derived from the inductive coupling mechanism described hereinabove, for use by the other components of the EOMS 402 when the engine is operating. The current associated with this stored energy may be sent directly to a computing element 520 (such as, for example, a microcomputer, microcontroller or a microprocessor, or a suitable application-specific logic component). Preferably, however, the current is sent through the base emitter bipolar transistor 504 to the computing element 520. The base emitter transistor 504 allows the current to be sensed by the computing element 520 in a manner as will be described later hereinbelow.

The EOMS 402 may also comprise an auxiliary battery 508 which may be alternately used to power the computing element 520 and may be used to power an audible alerting device 514 that is preferably powerful enough to be audible over engine background noise. Further, the battery 508 may be used to render a conventional memory storage device 524, which may be part of the computing element 520, into a non-volatile memory device. Alternatively, an electrically erasable device may be used when there is no battery. It should be firmly kept in mind that the use of the auxiliary battery 508 is merely an enhancement within the scope of the present invention and should not be thought of as a necessary element thereof.

The audible alerting device 514 may preferably comprise a piezoelectric sounder or other suitable device which, when the engine is turned off, is powered by the battery 508. Alternatively, in some exemplary embodiments, the altering device 514 may also comprise a visual display such as a light-emitting diode (LED) display or a liquid crystal display (LCD). When used in a battery-powered arrangement, the audible alerting device 514 is not required to operate over the noise of the engine. Accordingly, only a small amount of the battery capacity is used when the alerting device 514 is activated. Thus, it can be appreciated that since the auxiliary battery 508 may typically be used only briefly at the end of an engine running sequence, a highly portable battery with a small form factor such as a Lithium or NiCad battery may be used in the circuit of the EOMS 402. It should further be appreciated that these batteries are recharged by the power harnessed from the magnetic/inductive coupling provided in accordance with the teachings of the present invention.

Continuing to refer to FIG. 5, the computing element 520 receives and counts the spark plug pulses as amplified by the bipolar transistor 504. A resistor 506 pulls the signal level at the transistor output (the collector 504-C) back to ground or substantially near zero volts when no current flows to the spark plug. When current flows to the spark plug, the signal level at the collector 504-C swings back to a positive voltage level. Thus, in essence, the spark plug not only acts as a source of operating voltage, it also acts as a "tachometric" signal to the computing element 520.

An engine temperature sensor, such as a thermistor 516, in combination with a pull-up resistor 518, may be disposed as part of the EOMS 402 circuitry to measure the temperature of the air in the engine compartment. Clearly, this sensing arrangement requires no extra connections to the engine. The output of the thermistor 516 is converted to a digital format by an analog-to-digital converter (ADC) 522 before it is provided to the processor of the computing element 520. In some implementations, as is well-known, the ADC 522 and the computing element 520 may be integrated into a single unit. Also, the ADC 522 may be any of the devices using a variety of means to convert the analog measurements into digital form, such as a voltage-to-frequency converter or conventional successive approximation register ADC.

The presently preferred embodiment of the temperature sensing system, the thermistor 516 in series with a pull-up resistor 518, is designed such that a variable voltage is generated in proportion to the engine temperature. Alternatively, the temperature sensing system may comprise a thermocouple or semiconductor device and the like. Further, it may be provided as an integrated component of the computing element 520 as well.

The computing element 520 is provided with timing signals from a Timing Element or timer 512 such as an oscillator for controlling the timing of the operations executed thereby. The timing signals may also be used to generate an audible alert signal by the audible alerting device 514. The periodic timing signals are used to generate periodic interrupts to the software that runs on the computing element 520. While it is well-known that the timing oscillator 512 may be set to the lowest possible operating frequency at which the computing element 520 may reliably operate, in the presently preferred exemplary embodiment, the oscillator 512 preferably operates at 111 KHz. Favorable results have been obtained at this operating frequency, which is the lowest frequency that the computing element 520 can use while causing the audible altering device 514 to operate at around 2.7 KHz for optimum volume.

Still continuing to refer to FIG. 5, the computing element 520 also receives signals from a key pad 510. In its simplest form, the key pad 510 may comprise an oil change reset push button switch. It may also comprise any contact closure device. The key pad 510 is activated by an operator when the oil is changed to re-initialize the computing element 520 and the data stored in the non-volatile memory 524. Since a weak battery will not generate a sound as loud as a fresh battery, the key pad 510 may also be activated by the operator to indicate the status of the auxiliary battery 508.

Alternatively, the reset push button switch or the key pad 510 may be used by the operator to change selected parameters which cause or modify the oil change intervals to be different from those intervals recommended or suggested by the manufacturer to suit particular operating conditions of the vehicle. Also, the key pad 510 may be used by the operator to enter a fuel-related parameter, such as the type of fuel being used in a multi-fuel engine (i.e., an engine capable of operating with plural types of fuels), as shall be explained hereinbelow.

In the presently preferred exemplary embodiment of the present invention, the reset push button 510 is simply held down for various periods of time, thereby signaling to the computing element 520 that one of a plurality of operations is to be performed. For example, a short press having a duration of T1 may indicate a battery test associated with the auxiliary battery 508. A push down of a second time duration T2 (T2>T1) may preferably indicate a reset for the computing element 520 and the associated data storage. A third, still longer press of T3 (T3>T2) may be used to indicate the updating of the internal threshold counters (not shown) of the computing element 520 and/or the EOMS 402 to new intervals by changing the appropriate maximum values. In the preferred embodiment, an audible beeper is set to beep once per second, and a minimum of two beeps is generated for the battery test. If the key pad 510 is still pressed down after two seconds, five additional beeps are generated to indicate that the oil interval has been reset. If the key pad 510 is held down for an even longer time (i.e., for more than five beeps), appropriate updating of the internal threshold counters may be effectuated and, preferably, after a selected number of additional beeps, the beeper mechanism of the EOMS 402 may be programmed to be turned off. It should be appreciated that by counting the beeps, it is easy for an operator to activate all three functions with one switch. Alternatively, a key pad with an array of switches may also be used for achieving the same functionality.

A sound generator for the audible alerting device 514 may be activated by the computing element 520 to generate a momentary distinctive audible sound to alert the vehicle operator when an "OIL CHANGE REQUIRED" state is reached. The sound generator may alternatively be used to indicate via different audible sounds (or, in the presently preferred exemplary embodiment, a different total number of audible sounds) that the oil change interval has been exceeded. Also, the total number of audible sounds emitted in the preferred embodiment may be incremented each time the alert system is activated, thereby creating a longer and longer series of audible tones to be emitted as the operator delays or continues to procrastinate changing the oil.

As has been described hereinabove, the process flow associated with the EOMS 402 and the oscillator 512 of the presently preferred embodiment is adjusted so that the frequency of the audible alert device 514 is set to a resonant frequency of 2.7 KHz. Also, it should be appreciated that running the computing element 520 at the lowest possible frequency lowers power requirements and extends the normal operating range of the device from 85° C. to over 150° C. which is typical of the temperatures found under the hood of a car.

The presently preferred exemplary embodiment of a methodology for determining oil change intervals will now be explained hereinbelow with reference to the flow diagrams depicted in FIGS. 6 through 10, taken together with the description of the EOMS 402 set forth above.

Figure 6:
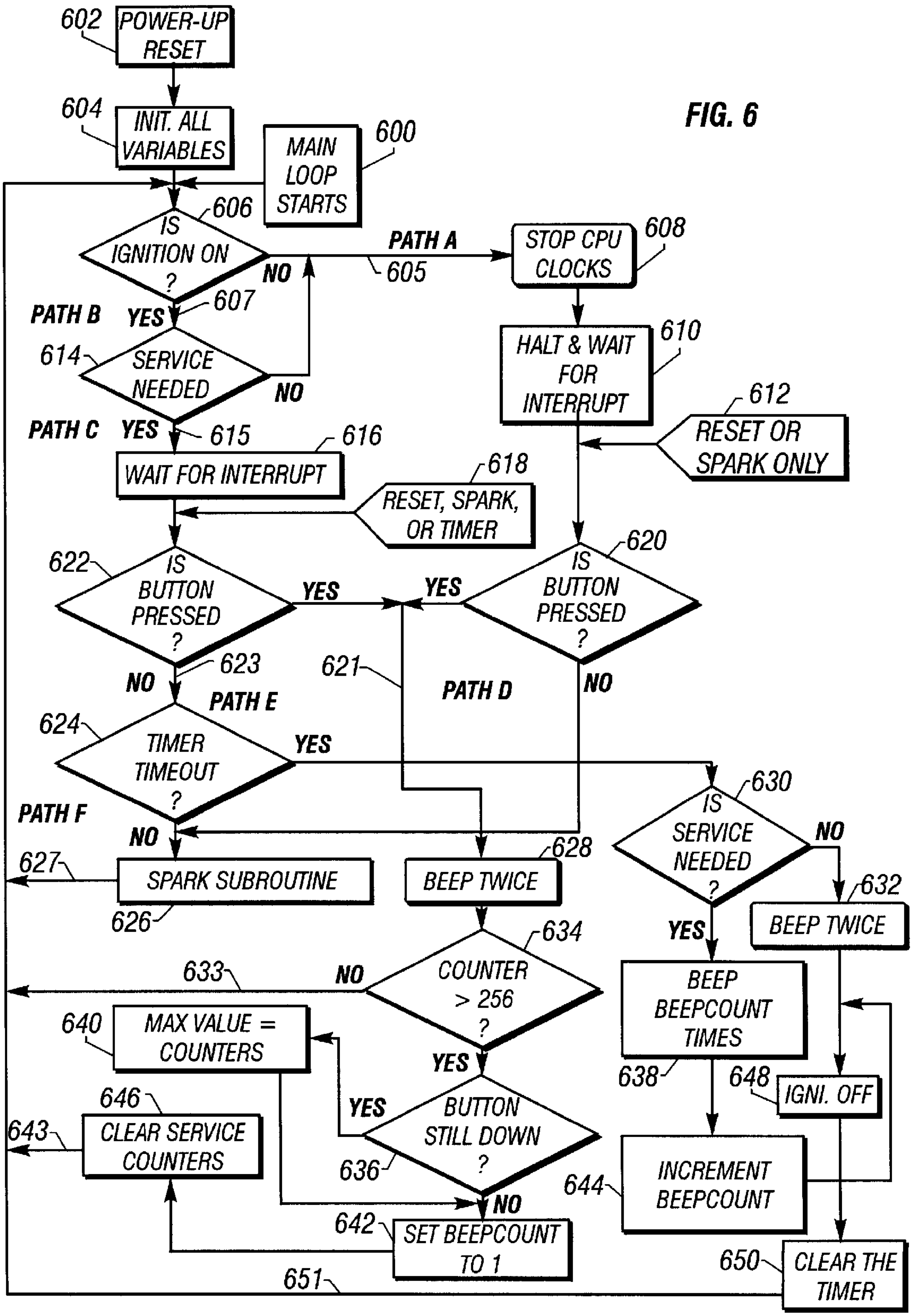
FIG. 6 is a flow diagram illustrating a presently preferred embodiment of the main control process operable with an ESMS provided in accordance with teachings of the present invention.

When the EOMS 402 of the present invention is first powered up, the computing element 520 sets the basic operating parameters and other software flags to an initial state. Steps 602 and 604 in FIG. 6 represent these setup processes, which are typically performed only once, preferably at the factory where a device embodying the present invention is manufactured and final-tested, or after a fresh battery is inserted.

As is well-known, the ignition system will be activated whenever the ignition switch of a vehicle is turned to the "RUN" or "ON" position. As explained in the foregoing description with reference to FIG. 3, the ignition energy is inductively coupled with the EOMS circuitry by the pickup coil 404. The inductively coupled ignition energy is rectified by the rectifier 502, thereby charging the capacitive storage 504. Sufficient current flow is sent to the capacitive storage 504 to allow the computing element 520 to operate until another ignition pulse is received, repeating the charging of the capacitor 504. It should be appreciated that during the engine operation, the EOMS 402 operates entirely based on this charging current, thereby requiring no electricity from any auxiliary batteries (for example, the battery 508 shown in FIG. 5), or the external engine battery. Accordingly, when operated in this manner, the EOMS of the present invention may be practiced with engine systems with magnetos such as, for example, lawnmower and airplane engines, where no vehicle battery is typically provided for operating the ignition system.

Continuing with the general operation of the present invention, the charging current provided through the emitter 504-A and base 504-B of the transistor 504 causes it to turn on, thereby creating a current flow from the emitter 504-A to the collector 504-C. Since the emitter 504-A is coupled to the DC voltage from the rectifier 502, the collector 504-C reaches a positive level which is sent to the computing element 520 on an interrupt pin (not shown) associated therewith.

Until the ignition system is turned on (shown in decision block 606 in FIG. 6) and ignition pulses are sent to the storage capacitor 504, the computing element 520 takes Path A (path 605) to a low-power stop mode wherein the processor clocks are stopped and the oscillator 512 is deactivated (step 608), so that power consumption is minimized. The computing element 520 may be completely powered down if non-volatile memory 524 is used for storing "tachometric" pulse counts from the spark plugs. Alternatively, the auxiliary battery 508 may be used for powering the memory 524.

If Path B (path 607) is taken from the decision block 606 in FIG. 6, the process flow proceeds to determine whether any oil or other service interval has passed (thereby signifying the need to service, as shown in the decision block 614). If no service is needed, then the process flow returns to the low-power mode by stopping the CPU clocks and waiting for interrupts (block 610). On the other hand, if service is needed, Path C (path 615) is taken from the decision block 614, whereby the computing element 520 enters a stand-by mode (block 616). In this mode, the computing element 520 is in a partially-running state where the Timing Element (oscillator) 512 is kept activated. Accordingly, it can be seen that once the main process loop starts (as indicated in block 600), the computing element 520 enters into a low-power state and waits for interrupts (block 610) or into a stand-by state and waits for interrupts (step 616). The stand-by state is later used to measure the intervals between spark or ignition pulses so that an IGNITION OFF state can be determined.

As indicated in block 612, there are two sources of interrupts to the computing element 520 when it is in the low-power state: reset or spark. On the other hand, three sources of interrupts are available when the computing element 520 is waiting for interrupts in the stand-by state: reset, spark or timer (block 618). An interrupt service routine, shown in FIG. 7, is provided in accordance with the teachings of the present invention to accurately determine the type (and/or source) of an interrupt when it is generated so that an appropriate process segment is executed by the computing element 520.

Figure 7:
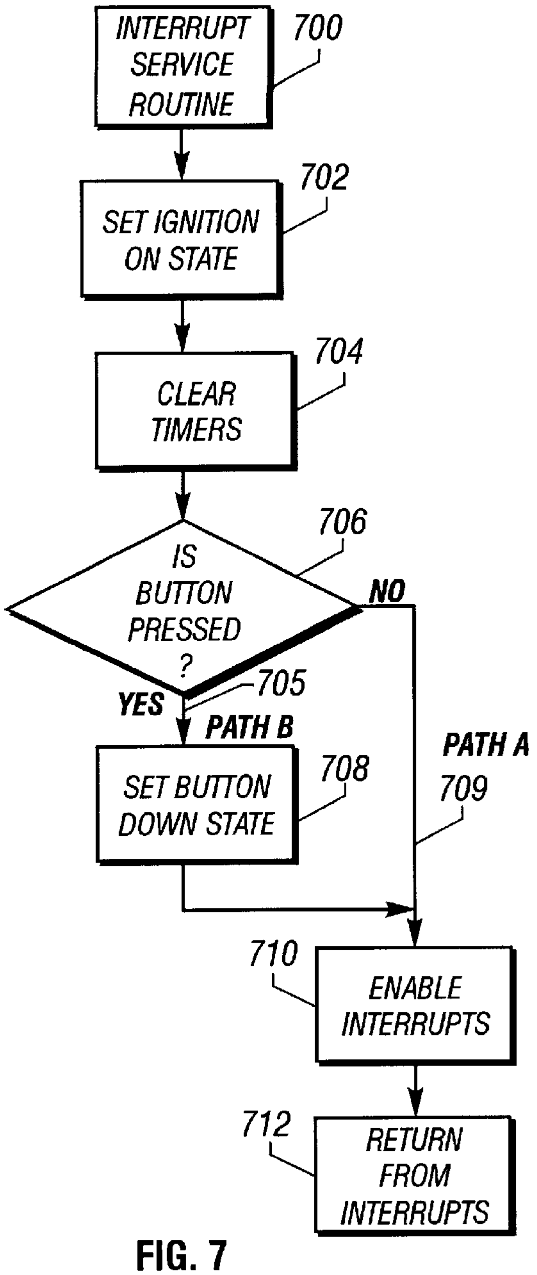
FIG. 7 is a flow diagram of an interrupt service subroutine used in the control process shown in FIG. 6.

Referring now to FIG. 7, upon entering the interrupt service routine (block 700), the computing element 520 sets a flag associated with the IGNITION ON state to be TRUE (step 702). The timers of the computing element 520 are then cleared (step 704). The state of the key pad 510 is determined by the decision block 706 to detect whether the button associated with the key pad 510 is pressed down. If the button is pressed, Path B (path 705) is taken to set a flag associated with the BUTTON DOWN state (step 708) to be TRUE. Appropriate interrupts are then re-enabled (step 710). On the other hand, if the button is not pressed (or held) down, Path A (path 709) is taken directly to enable the interrupts. The control then returns to the point in the main loop (shown in FIG. 6) from where the interrupt service routine was called (that is, either block 612 or block 618).

Referring again to FIG. 6, if the reset button is determined to be pressed down (decision blocks 620 or 622), regardless of which state the computing element 520 was in when the interrupt was received, Path D (path 621) is taken to activate the alerting device 514 (shown in FIG. 5) to indicate the charge state of the auxiliary battery by producing an audible signal twice (step 628). The computing element 520 then proceeds to examine one or more service interval counters, each of which corresponds to a particular type of service and reads the spark/ignition pulses or some other count number dependent upon the pulse count, to determine if they are greater than a preset or selected value (decision block 634). This process step is taken to ensure that the threshold interval counters are not inadvertently or accidentally reset to some value other than a factory default setting, which may preferably be done by pressing the reset button down for some period of time (decision block 636). That is, preferably, only when the operator has pressed the key pad after installing the engine service monitoring system (ESMS) of the present invention on an engine, has also operated the engine for some period of time, and desires to set the service interval to a new interval by pressing and holding the key pad, the service threshold interval counters may be selectively reset to different values.

If the value of any counter (corresponding to a particular service parameter) is determined to be less than the selected value (for example, 256, or alternatively, an arbitrary value greater than 0), then the process flow takes a return path, path 633, back to the starting point of the main loop (block 600). This return flow path typically corresponds to the situation where the operator has pressed the reset button before the ESMS was installed on an engine and the device has beeped twice or produced a suitable audible alert to indicate the state of charge of the auxiliary battery associated with the ESMS. It can be appreciated that this is a valuable feature when the device needs to be demonstrated for a customer who wishes to purchase it, without resetting any factory-set parameters.

If the decision block 634 determines that the value in a service counter is greater than 256, then a determination is made to test whether the reset button is still pressed down (decision block 636). If so, a new value for a corresponding service threshold counter/register may be entered by the operator (step 640) using the key pad 510. Alternatively, instead of entering a new threshold value, the current service counter value may be copied into the threshold counter/register. A count variable associated with the audible signal (called "beepcount") is then set to 1 (step 642). On the other hand, if the button is no longer pressed down, a new set point or threshold value for the counter is not entered, and the beepcount is set to 1 directly. The variable service counters are then brought back to zero (step 646) for counting the pulses again relative to either the new or prior set point. The process flow is returned back to the main loop starting point (block 600) via return path 643.

If the reset button was not the cause of the interrupt to the computing element 520, the process flow from the decision block 622 takes Path E, path 623, to determine if the interrupt was caused by the Timing Element or timer of the ESMS (decision block 624). If the timer was not the cause of the interrupt (which is preferably provided when the engine or the vehicle is turned off after running for some period of time), then the interrupt is determined by the process of elimination to have been caused by the spark pulse of the engine. Accordingly, a "spark" interrupt subroutine (block 626), depicted in FIG. 8, is called in the main loop of the process flow.

Figure 8:
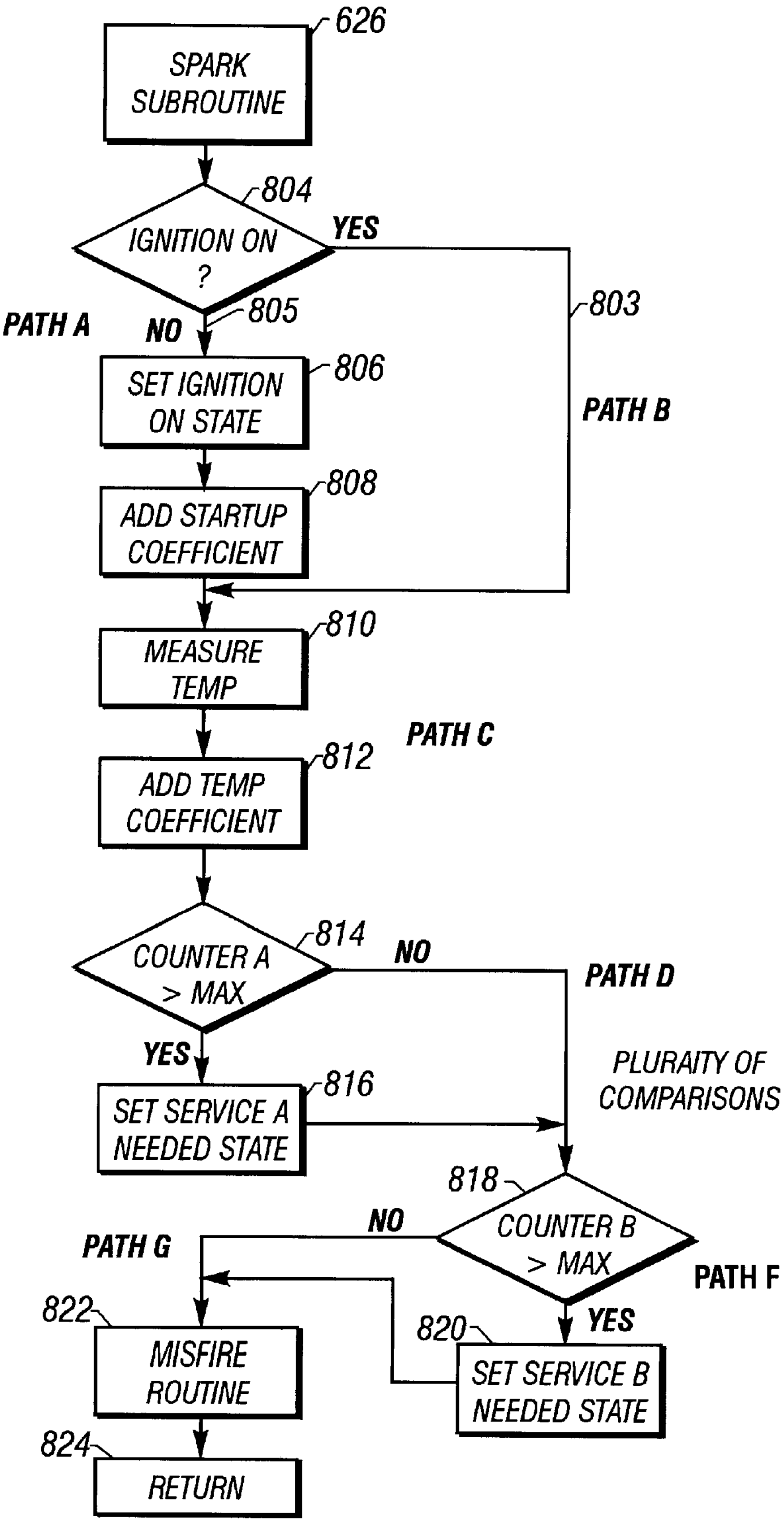
FIG. 8 is a flow diagram of a spark subroutine used in the control process shown in FIG. 6.

Referring now to FIG. 8, depicted therein is a flow diagram for the spark subroutine 626. This subroutine is called in the main process loop each time an interrupt is generated on account of a spark pulse produced while the engine is running. The subroutine begins by testing the IGNITION ON flag (decision block 804) to determine whether the flag is set or not. If the flag is not set, Path A (path 805) is taken to set the flag ON (step 806). Subsequently, a suitable "startup" coefficient or weighting factor is added to the value of the counter for the current oil change interval (step 808) in order to adjust for the startup situation where there is little or no oil pressure. It should be appreciated that the ability to adjust the change interval for a just-started engine (as opposed to an engine that has been running for some period of time) is a substantial improvement over prior art devices. Also, when an engine monitor system that uses conventional odometric indications (which reflect wheel revolutions rather than the engine revolutions) to measure oil or service change intervals, and the engine starts and stops in quick successions, with little or no substantial driving, the engine oil may get very dirty before the appropriate interval elapses. Accordingly, such an odometric measurement would not yield an accurate reading because of the lack of the adjustment contemplated herein. That this is a valuable feature for city driving conditions should be readily appreciated by those skilled in the art.

If the ignition flag was determined to be set, as per the decision block 804 (that is, the ignition is already on), Path B (path 803) is taken instead, bypassing the adjustment step for the low- or no-oil-pressure startup (step 808) condition discussed above. The spark subroutine then enters a step of temperature measurement (step 810). After the temperature measurement, a suitable temperature-based coefficient (or, adjustment) is added to the counter (step 812) for the current oil change interval. The temperature measured is the air temperature of the engine which closely matches the oil temperature and water temperature of the engine.

By including a temperature measuring circuit such as a thermistor 516 shown in FIG. 5, the ESMS can be calibrated with extra counts needed when high or low temperature is detected. As is known, cold engine starts cause greater wear to engine parts since the oil is thicker and flows slowly. High temperature engine operation also causes increased wear to engine parts because the oil is thinner and degrades with temperature.

Figure 10:
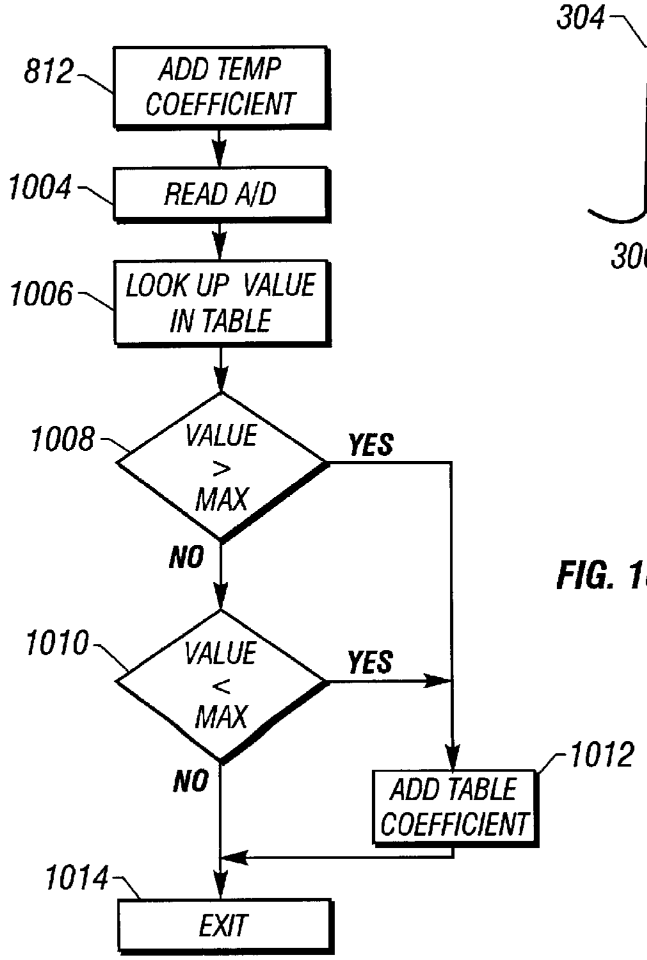
FIG. 10 is a flow diagram of a temperature coefficient subroutine used in the control process shown in FIG. 8.

The temperature-based adjustment is provided by invoking another subroutine (called "Add Temp Coefficient"), depicted as a flow diagram in FIG. 10. The electrical measurement provided by the thermistor or other suitable mechanism is first digitized by an analog-to-digital converter. After reading the digitized value (step 1004), a lookup table is accessed (step 1006) to determine the corresponding temperature value. The temperature value is then compared against a maximum (decision block 1008) and a minimum (decision block 1010), whose values are preferably provided in a suitable data storage structure. If the value is outside the range, a corrective weighing factor is retrieved from the lookup table or a separate data storage structure and added to the service change interval counter (step 1012). If the value is within a predetermined normal temperature range for an operating engine, the weighing factor is set to a minimum. After a suitable adjustment, the Add Temp Coefficient subroutine returns to the point where it was called in the spark subroutine.

Referring again to FIG. 8, a plurality of counters and/or related service flags are then tested against the stored maximum allowed values (threshold values or set points) corresponding to the service counters. For example, decision blocks 814 and 818 correspond to two services, service A and service B, respectively. Each counter corresponds to one of many possible service items associated with the engine and/or the vehicle. If a counter value is greater than the stored maximum, a service flag associated therewith is set, signifying that service is needed with respect to that service parameter (e.g., steps 816 and 820). It should be appreciated that an unlimited number of possible service items may be detected in this manner. For example, the ESMS can also detect and monitor excessive or extensive idling. Since the ESMS counts spark pulses which relate to engine revolutions, it automatically includes the engine wear in its internal count. The ESMS may be modified to add extra counts, appropriately calibrated, when idling for a period of time is detected.

Figure 9:
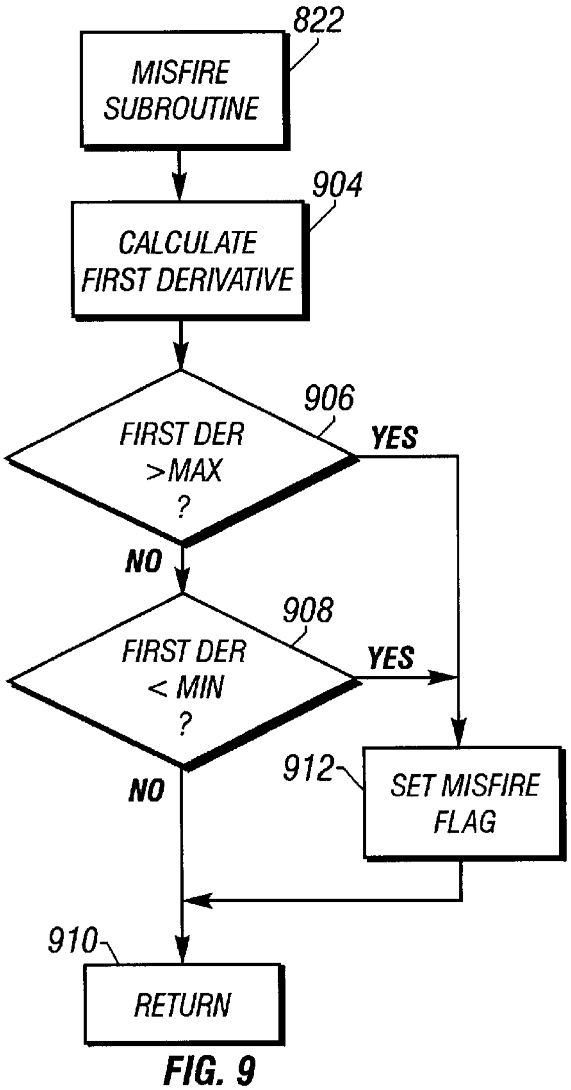
FIG. 9 is a flow diagram of a misfire subroutine used in the control process shown in FIG. 8.

Also, spark plug misfire may also be detected within the spark subroutine in accordance with the teachings of the present invention, by calling a "misfire" subroutine (block 822). FIG. 9 depicts a flow diagram for an exemplary embodiment of the misfire subroutine. As is understood in the art, misfire of an engine may be caused by spark pulses that occur at the wrong time. Pulses that occur too rapidly can be caused by a fouled plug or by cross-firing, which in turn may be caused by a bad distributor cap or bad wiring. Pulses that occur too slowly may be caused by dirty plugs or cracked wiring, or misadjusted points.

The ESMS of the present invention detects the misfire conditions preferably by monitoring the rate of change of spark plug impulses. The rate of change is the first derivative of the rate of firing. Accordingly, after calculating the first derivative (step 904), it may preferably be stored in a non-volatile memory. During each calculation of a spark plug interval by the spark subroutine, a maximum allowable first derivative and a minimum allowable first derivative are computed and stored in the non-volatile memory. If the first derivative of the next spark plug interval is outside the range defined by the stored limits (as determined by decision blocks 906 and 908), then a misfire flag is set (step 912).

Otherwise, the misfire subroutine returns to the spark subroutine, as indicated by step 910. The misfire flag may preferably be used during the alerting phase of the main process flow to generate an appropriate indicator to the operator.

Additional vehicle service parameters or conditions that may be monitored in accordance with the teachings of the present invention include without limitation, for example, brake fluid replacement/checking, transmission and differential oil changes, water/anti-freeze engine coolant changes, fuel filter replacement, drive belt adjustment, air cleaner filter changes, tire rotation, PCV valve checking, or any number of other factors related to engine life and performance such as brake pads and brake disks, drums and lining, brake fluid level, lubrication of steering gear and linkage, ball joints and shock absorbers, exhaust gas sensors, ignition system maintenance check list, carburetor system check list, exhaust system check list, seat belts, retractors, anchors and adjustors, vapor and fuel lines, power steering fluid level, propeller shafts, locks, hinges, and hood latch, various belts and their tightness, air pressure in tires, valve clearance, wheel alignment, idle RPM checking, chassis lubrication, bearing lubrication and spark plug replacement. Accordingly, it should be understood that the spark subroutine 626 depicted in FIG. 8 is provided primarily for illustrative purposes, and the number of service interval counters provided therein may vary greatly, depending upon the implementational objectives.

A sound generator subroutine may also preferably be provided for generating different tones or a different total number of audible sounds to indicate that a particular service interval has been exceeded. In the presently preferred exemplary embodiment, the total number of audible tones emitted is incremented by changing the beepcount variable each time the alert system is activated, thereby an increasing number of audible tones are emitted as the operator continues to ignore the service change alarm or otherwise not act with respect thereto.

Referring again to the main process loop depicted in FIG. 6, after the spark subroutine is executed, the process flow takes the return path 627 to the start of the main loop block 600. Having described in detail the reset and spark interrupt mechanisms, the third interrupt mechanism, the timer interrupts caused by the Timing Element 512 (shown in FIG. 5), may now be set forth below.

As explained in the foregoing, the timer interrupts are provided only when the engine is in a stand-by state (block 616). The Timing Element 512 may be implemented as a series of flip-flops wired in an UP-counter. Alternatively, it may be provided as a series of flip-flops in a DOWN-counter, or an analog timer such as a one-shot mechanism. In the presently preferred exemplary embodiment of the present invention, the Timing Element 512 is provided as an UP-counter that simulates the operation of a retriggerable one-shot timer. Each spark impulse retriggers the one-shot or the timer. If the one-shot or timer expires, then it indicates that the engine must have been turned off, as there are no more spark impulses to activate the timer or one-shot retriggered.

Preferably, the Timing Element initially starts at an initial state of "0" which may be a count of all "zeros" for the UP-counter. For the DOWN-counter implementation, all "ones" may be used as the starting count in the counter. Any other arbitrary starting value may be used without departing from the teachings of the present invention.

The timer is used for detecting whether an ENGINE OFF state exists. If the user has been operating the engine, it is preferable that the timer threshold value is set to several seconds, so that there is enough time to completely stop the engine from running and to prevent any engine noise from drowning out the audible alarms. In this manner, no visible indicators are needed, and no external wiring or breaching of the vehicle firewall is necessary.

After a predetermined period of time, the timer reaches its threshold and produces an interrupt which is provided to the computing element 512. Thus, the timer interrupt will be typically generated only when the engine is off. Preferably, the predetermined period of time is set to be longer than the spark discharge impulse period, T, shown in FIG. 3. Since the spark discharge impulses are typically no slower than several tenths of a second, a time interval of 2 to 3 seconds may be adequate for the timer threshold. However, a longer time period may be preferred if additional features are to be added in the sound generator subroutine associated with the audible alert system.

Accordingly, it is clear that as long as the spark plug discharge impulses continue to arrive at a rate faster than the interval that is programmed into the Timing Element, it will be continually reset to its initial state. Therefore, there will be no timer-based interrupts to the computing element 520 in this situation. When the engine is turned off, the timer interrupt is generated to indicate that the timer has timed out (decision block 624). Another decision block, block 630, is used for determining if there is any indication of a service being needed. If so, the audible alert system beeps the number of times to which the beepcount variable is equal (step 638). The beepcount variable is then incremented (step 644). If, on the other hand, no service is needed, the alert system beeps a fixed number of times (for example, twice) (step 632).

After incrementing the beepcount variable or after beeping a fixed number of times, the ignition OFF flag is set (step 648) and the timer is cleared (step 650). By a return path, path 651, the flow control is transferred to the start of main loop block 600. Since the ignition OFF flag has been set, the decision block 606 yields a low-power "sleep" state (block 610) for the computing element 520 at this point. Since the engine has been stopped, the non-volatile memory 524 may now be powered by the auxiliary battery 508.

Based upon the foregoing, it should now be apparent to those of ordinary skill in the art that the present invention provides an advantageous solution which allows an operator to monitor numerous engine service parameters by using an efficient, low-cost solution that combines the ease of operation with a compact form factor, and operates off the spark plug energy. It should further be appreciated that the ESMS of the present invention offers several advantages over the current monitoring systems in use. Whereas the current service monitoring systems require that engines have a tachometric output, as is found on vehicles with distributors, the ESMS may be used in many applications, ranging from automobiles, to marine engines of either in-board or out-board types, motor cycles, mopeds, all terrain vehicles, snowmobiles, lawn mowers, power equipment, and to farm and industrial equipment.

Moreover, the ESMS of the present invention is usable with various engine types, regardless of the number of strokes, cylinders or the type of the fuel used. The ESMS also allows field adjustment of the factory-set coefficients and set points. Since several service parameters are coupled to the count of spark plug impulses, numerous maintenance items may be monitored cost-effectively for a host of applications such as, for example, repair, replacement, adjustment, addition and inspection of engine/automobile parameters. As described hereinabove, these parameters may typically include, for example: brake fluid replacement/checking, transmission and differential oil changes, water/anti-freeze engine coolant changes, fuel filter replacement, drive belt adjustment, air cleaner filter changes, tire rotation, PCV valve checking, or any number of other factors related to engine life and performance such as brake pads and brake disks, drums and lining, brake fluid level, lubrication of steering gear and linkage, ball joints and shock absorbers, exhaust gas sensors, ignition system maintenance check list, carburetor system check list, exhaust system check list, seat belts, retractors, anchors and adjustors, vapor and fuel lines, power steering fluid level, propeller shafts, locks, hinges, and hood latch, various belts and their tightness, air pressure in tires, valve clearance, wheel alignment, idle RPM checking, chassis lubrication, bearing lubrication and spark plug replacement.

The ease of installment of the ESMS of the present invention should also be apparent to those of ordinary skill in the art. Whereas the current monitoring systems typically required a breach in the vehicular firewall so as to provide visual indicators for service items, the present invention requires no such breach, thereby greatly improving the ease of installation and safety.

Also, since the teachings of the present invention may be implemented even in engines without a tachometer output, the ESMS of the present invention can be used in magneto systems typically found in lawnmower and airplane engines.

Although the system and method of the present invention have been described in particular reference to engine oil service parameters, it should be realized upon reference hereto that the innovative teachings contained herein are not necessarily limited thereto and may be implemented advantageously with any applicable engine and/or vehicular service parameter as set forth hereinabove.

In addition, it is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow. For example, several types of rectifying circuits may be used in the ESMS for providing a DC pulse output from the inductively coupled spark discharge impulses. As has been described above, various arrangements may be had with respect to the counters, timers, computing elements, non-volatile memory storage, and temperature sensors and alert systems.

Accordingly, it should be understood by those of ordinary skill in the art that all these and other such permutations, combinations, rearrangements and extensions of the innovative teachings contained herein are expressly deemed to be part of the scope of the present invention which is solely limited by the following claims.

What is claimed is:

1. A service monitoring system for an engine of the type which includes at least one spark plug connected to a secondary side of an ignition transformer coil via a spark plug wire, the ignition transformer coil providing high voltage spark pulses while the engine is turned on by an ignition contact, the service monitoring system comprising:

a magnetic core having a passage therethrough that surrounds the spark plug wire on the secondary side of the ignition transformer coil;

a pickup coil with a conductive wiring disposed around the magnetic core, the pickup coil inductively coupled to the spark plug wire for generating an induced current through the conductive wiring of the pickup coil when the high voltage spark pulses are created;

counting circuitry coupled to the pickup coil, the counting circuitry determining a count of induced current pulses corresponding to the high voltage spark pulses; and an alarm indicator coupled to the counting circuitry to indicate a status of a service parameter, responsive to the count of the induced current pulses.

2. The service monitoring system as set forth in claim 1, wherein the counting circuitry comprises means for monitoring a temperature of the engine and means for adjusting the count of the induced current pulses based on the temperature of the engine.

3. The service monitoring system as set forth in claim 1, wherein the counting circuitry comprises at least one counter corresponding with the service parameter for keeping track of at least one of the number of induced current pulses and a variable derived therefrom, and the service monitoring system further comprising:

means for adjusting the counter based on a temperature measurement with respect to the engine;

means for resetting the counter to an initial value;

means for storing a service interval threshold value associated with the service parameter; and means for determining that the service interval threshold value associated with the service parameter has been exceeded by the counter.

4. The service monitoring system as set forth in claim 3, further comprising means for resetting the service interval threshold value.

5. The service monitoring system as set forth in claim 4, further comprising means for preventing accidental resetting of the service interval threshold value.

6. The service monitoring system as set forth in claim 3, further comprising means for adjusting the value contained in the counter on the basis of a low oil pressure.

7. The service monitoring system as set forth in claim 3, further comprising an auxiliary power source and means for indicating a remaining capacity of the auxiliary power source.

8. The service monitoring system as set forth in claim 3, wherein the service parameter is selected from the group consisting of brake fluid replacement, brake fluid checking, transmission changing, differential oil changing, engine coolant changing, fuel filter replacement, drive belt adjustment, air cleaner filter changing, tire rotation, PCV valve checking, brake pad monitoring, brake disk monitoring, drums and lining inspection, brake fluid level monitoring, lubrication of steering gear and linkage, lubrication of ball joints and shock absorbers, exhaust gas sensor monitoring, ignition system maintenance, carburetor system checking, exhaust system checking, seat belt adjustment, retractors' adjustment, monitoring vapor and fuel lines, power steering fluid level monitoring, propeller shaft monitoring, adjusting locks and hinges, adjusting hood latch, monitoring belts and their tightness, monitoring air pressure in tires, monitoring valve clearance, monitoring wheel alignment, idle RPM checking, chassis lubrication, bearing lubrication and spark plug replacement.

9. An engine service monitoring system (ESMS) adapted for use with an engine, the engine being operable with an ignition circuit having an ignition coil, a spark plug, and a spark plus wire leading from a secondary side of the ignition coil to the spark plug, the ESMS comprising:

counting means for counting high voltage ignition pulses passing through the spark plug wire in the course of operation of the engine to determine a count thereof;

means for inductively coupling the counting means to the spark plug wire;

means for storing a threshold value with respect to a service parameter;

means for comparing the count of the ignition pulses to the threshold value; and means for providing an audible alert to an operator when the count of the ignition pulses exceeds the threshold value.

10. The engine service monitoring system as set forth in claim 9, further comprising means for adjusting the threshold value.

11. The engine service monitoring system as set forth in claim 9, further comprising means for measuring a temperature of the engine and means for adjusting the count of the ignition pulses based on the engine temperature.

12. The engine service monitoring system as set forth in claim 9, further comprising means for detecting a low oil pressure condition associated with the engine and means for adjusting the count of the ignition pulses based on the low oil pressure condition.

13. The engine service monitoring system as set forth in claim 9, further comprising means for detecting a spark plug misfire.

14. The engine service monitoring system as set forth in claim 9, wherein the service parameter is selected from the group consisting of engine oil changing, brake fluid replacement, brake fluid checking, transmission changing, differential oil changing, engine coolant changing, fuel filter replacement, drive belt adjustment, air cleaner filter changing, tire rotation, and PCV valve checking.

15. The engine service monitoring system as set forth in claim 9, further comprising means for resetting the count of the ignition pulses to a selected value.

16. A method of monitoring a service parameter associated with an engine having a spark plug, an ignition circuit with a transformer, and a spark plug wire disposed between the spark plug and a secondary side of the transformer, the ignition circuit for effectuating one or more high voltage pulses in the spark plug wire, the method comprising the steps of:

inductively coupling a counting circuit to the spark plug wire on the secondary side of the transformer;

counting the high voltage pulses with the inductively coupled counting circuit to determine a count thereof, the high voltage pulses being generated when the engine is operated;

measuring a temperature of the engine;

adjusting the count of the high voltage pulses based the measured engine temperature;

comparing the adjusted count of the high voltage pulses with a selected threshold value; and providing an alarm if the adjusted count of the high voltage pulses exceeds the selected threshold value.

17. The service monitoring method as set forth in claim 16, further comprising the steps of:

detecting a low oil pressure condition associated with the engine at the time of engine start-up; and adjusting the count of the high voltage pulses based on the detected low oil pressure.

18. The service monitoring method as set forth in claim 16, wherein the selected threshold value is factory-set.

19. The service monitoring method as set forth in claim 16, wherein the selected threshold value is field-adjustable.

20. The service monitoring method as set forth in claim 16, further comprising the steps of:

detecting whether the spark plug misfired during the operation of the engine; and providing an alarm to indicate that the spark plug misfired.

* * * * *